United States Patent
Ramappan et al.

(10) Patent No.: US 7,742,869 B2
(45) Date of Patent: Jun. 22, 2010

(54) LATE INTAKE VALVE CLOSING TO IMPROVE COLD STARTABILITY FOR SPARK-IGNITION DIRECT-INJECTION (SIDI) ENGINES

(75) Inventors: Vijay Ramappan, Novi, MI (US); Jesse M. Gwidt, Brighton, MI (US); Stuart R. Smith, Howell, MI (US); Michael J. Lucido, Northville, MI (US); Scot A. Douglas, Canton, MI (US); Kenneth J. Cinpinski, Ray, MI (US)

(73) Assignee: GM Global Technology Operations, Inc.

( * ) Notice: Subject to any disclaimer, the term of this patent is extended or adjusted under 35 U.S.C. 154(b) by 246 days.

(21) Appl. No.: 12/106,552

(22) Filed: Apr. 21, 2008

(65) Prior Publication Data

US 2009/0216428 A1 Aug. 27, 2009

Related U.S. Application Data

(60) Provisional application No. 61/031,096, filed on Feb. 25, 2008.

(51) Int. Cl.
*F02D 41/00* (2006.01)
*G06F 19/00* (2006.01)

(52) U.S. Cl. .................... 701/105; 123/90.16

(58) Field of Classification Search ......... 701/103–105, 701/102, 112, 113; 123/90.16, 90.17
See application file for complete search history.

(56) References Cited

U.S. PATENT DOCUMENTS

| 6,374,792 | B1* | 4/2002 | Suzuki et al. | 123/182.1 |
| 7,258,100 | B2* | 8/2007 | Pinkston | 123/90.16 |

FOREIGN PATENT DOCUMENTS

| DE | 102005007125 | 8/2006 |
| DE | 29620007 | 1/2007 |
| DE | 102007039458 | 4/2008 |
| EP | 1712765 | 10/2006 |

OTHER PUBLICATIONS

Corresponding German Office Action for 102009009514.4 dated Jul. 8, 2009, entitled "Late Intake Valve Closing to Improve Cold Startability for Spark-Ignition Direct-Injection (SIDI) Engines"; 4 Pages.

* cited by examiner

*Primary Examiner*—Hieu T Vo

(57) ABSTRACT

An engine control system includes a cam phaser that introduces a cam phase angle θ between a camshaft intake lobe and an associated crankshaft. An engine control module communicates with the cam phaser to introduce the cam phase angle θ while an engine is being started. The cam phase angle θ is selected such that the camshaft intake lobe opens an intake valve during at least a portion of a compression stroke of a cylinder that is associated with the camshaft intake lobe.

9 Claims, 3 Drawing Sheets

LATE INTAKE VALVE CLOSING TO IMPROVE COLD STARTABILITY FOR SPARK-IGNITION DIRECT-INJECTION (SIDI) ENGINES

CROSS-REFERENCE TO RELATED APPLICATIONS

This application claims the benefit of U.S. Provisional Application No. 61/031,096 filed on Feb. 25, 2008. The disclosure of the above application is incorporated herein by reference.

FIELD

The present disclosure relates to reducing cylinder pressure while starting a spark-ignition direct-injection (SIDI) engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Spark-ignition direct-injection (SIDI) engines include one or more fuel injectors that inject fuel directly into associated engine cylinders. While the engine is running, a fuel pump supplies fuel to a fuel rail at high pressure, e.g. 3-15 megapascals (435-2176 pounds per square inch). The fuel pump can be mechanically driven by the engine. The fuel rail provides the pressurized fuel to the fuel injectors, which inject the fuel into the cylinders at times and pulse widths that are determined by an engine control module.

When the engine is being started it takes some time for the fuel pump to raise the pressure in the fuel rail. During that time the fuel pressure may be too low for the fuel injectors to provide enough fuel to start the engine quickly and reliably. A fuel flow rate through a fuel injector is based on a pressure difference across a fuel injector nozzle. When the engine is first being started, the engine is rotating slowly and the mechanically driven fuel pump may not develop fuel pressure that exceeds pressure in the cylinders. The fuel pressure therefore may not be able to overcome the cylinder pressures as is needed to deliver fuel to the cylinder via the fuel injectors.

SUMMARY

An engine control system includes a cam phaser that introduces a cam phase angle θ between a camshaft intake lobe and an associated crankshaft. An engine control module communicates with the cam phaser to introduce the cam phase angle θ while an engine is being started. The cam phase angle θ is selected such that the camshaft intake lobe opens an intake valve during at least a portion of a compression stroke of a cylinder that is associated with the camshaft intake lobe.

In other features the engine control system includes a mechanical fuel pump that is driven by the camshaft. The engine control module communicates with the cam phaser to eliminate the cam phase angle θ after the engine is started such that the camshaft intake lobe is closed during a compression stroke of a cylinder that is associated with the camshaft intake lobe. A fuel injector injects fuel directly into the cylinder.

A method of controlling an engine includes determining whether an engine is being started and introducing a camshaft cam phase angle θ while the engine is being started. The cam phase angle θ is selected such that an intake valve is open during at least a portion of a compression stroke of a cylinder that is associated with the intake valve.

In other features the method eliminates the cam phase angle θ after the engine is started such that the intake valve is closed for the duration of the compression stroke. The method includes injecting fuel directly into the cylinder.

An engine control system includes a cam phaser that controls a cam phase angle θ between a camshaft intake lobe and an associated crankshaft, a fuel injector that injects fuel directly into a cylinder, a mechanical fuel pump that is driven by a camshaft and provides the fuel to the fuel injector, and an engine control module that communicates with the cam phaser to introduce the cam phase angle θ while the engine is being started and to eliminate the cam phase angle θ after the engine is started. The cam phase angle θ is selected such that the camshaft intake lobe opens an intake valve during at least a portion of a compression stroke of a cylinder that is associated with the camshaft intake lobe.

In still other features, the systems and methods described above are implemented by a computer program executed by one or more processors. The computer program can reside on a computer readable medium such as but not limited to memory, non-volatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
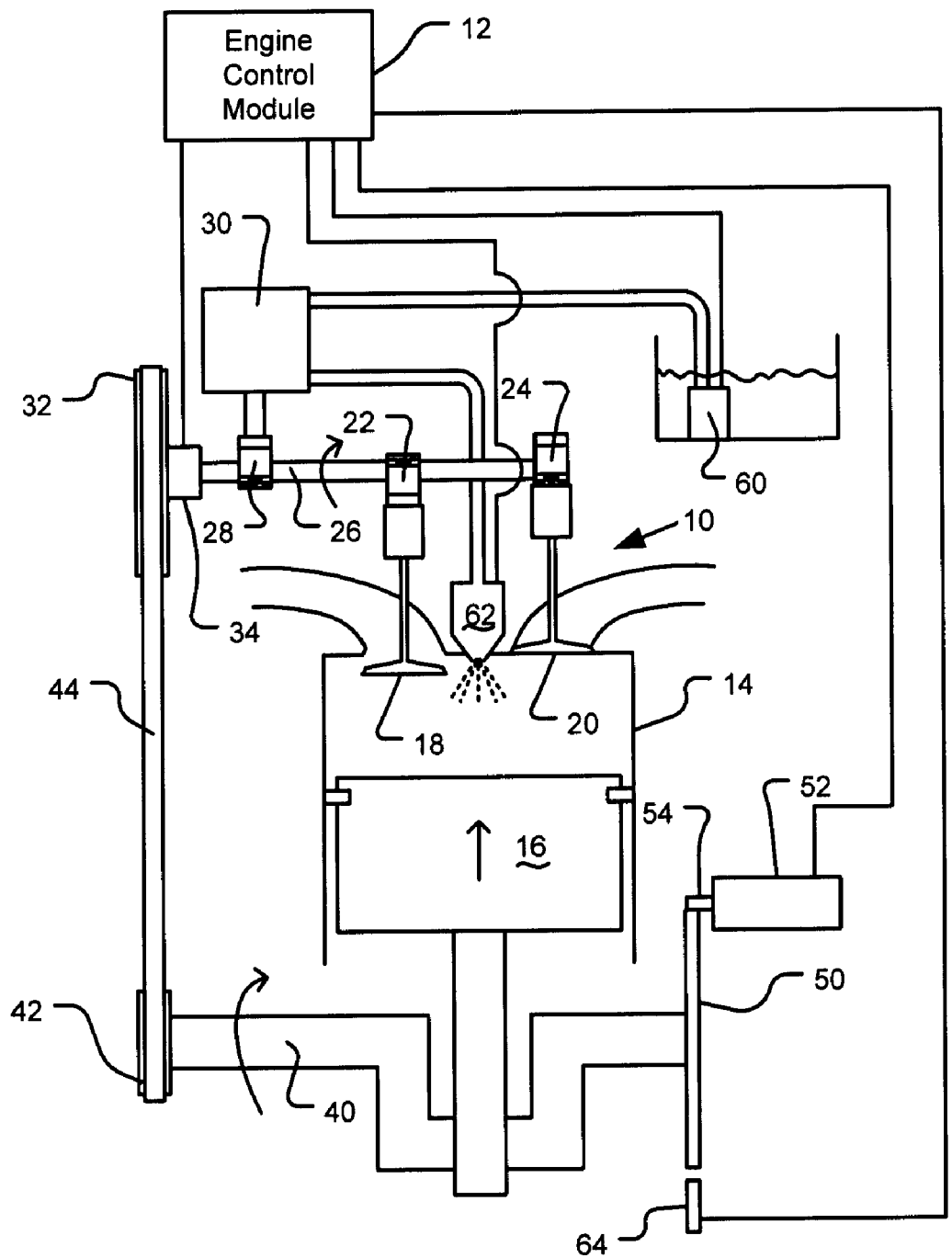
FIG. 1 is a functional block diagram of a spark-ignition direct-injection engine and associated engine control module.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram is shown of a spark-ignition direct-injection engine 10 with an associated engine control module 12. Engine 10 includes a cylinder 14 that contains a reciprocating piston 16. An intake valve 18 opens to allow intake air into cylinder 14. An exhaust valve 20 opens to allow exhaust gas to escape from cylinder 14. Opening and closing of intake valve 18 and exhaust valve 20 are controlled by associated intake cam lobe 22 and exhaust cam lobe 24. Intake cam lobe 22 and exhaust cam lobe 24 rotate together with a cam shaft 26. Cam shaft 26 also includes a fuel pump lobe 28 that drives a mechanical fuel pump 30. It should be appreciated that fuel pump 30 may also be gear driven or electric. A cam shaft gear 32 drives cam shaft 26 via an adjustable cam phaser 34.

Reciprocating piston 16 drives a crank shaft 40. A crank shaft gear 42 rotates with crank shaft 40. Crank shaft gear 42 drives cam shaft gear 32 via a belt or chain 44. In some embodiments the belt or chain 44 may be replaced with gears. A ring gear 50 is also attached to crank shaft 40. A starter motor 52 includes a pinion gear 54 that rotates and engages ring gear 50. Starter motor 52 can then rotate crank shaft 40 to begin reciprocating piston 16 moving up and down and start the engine.

Figure 2:
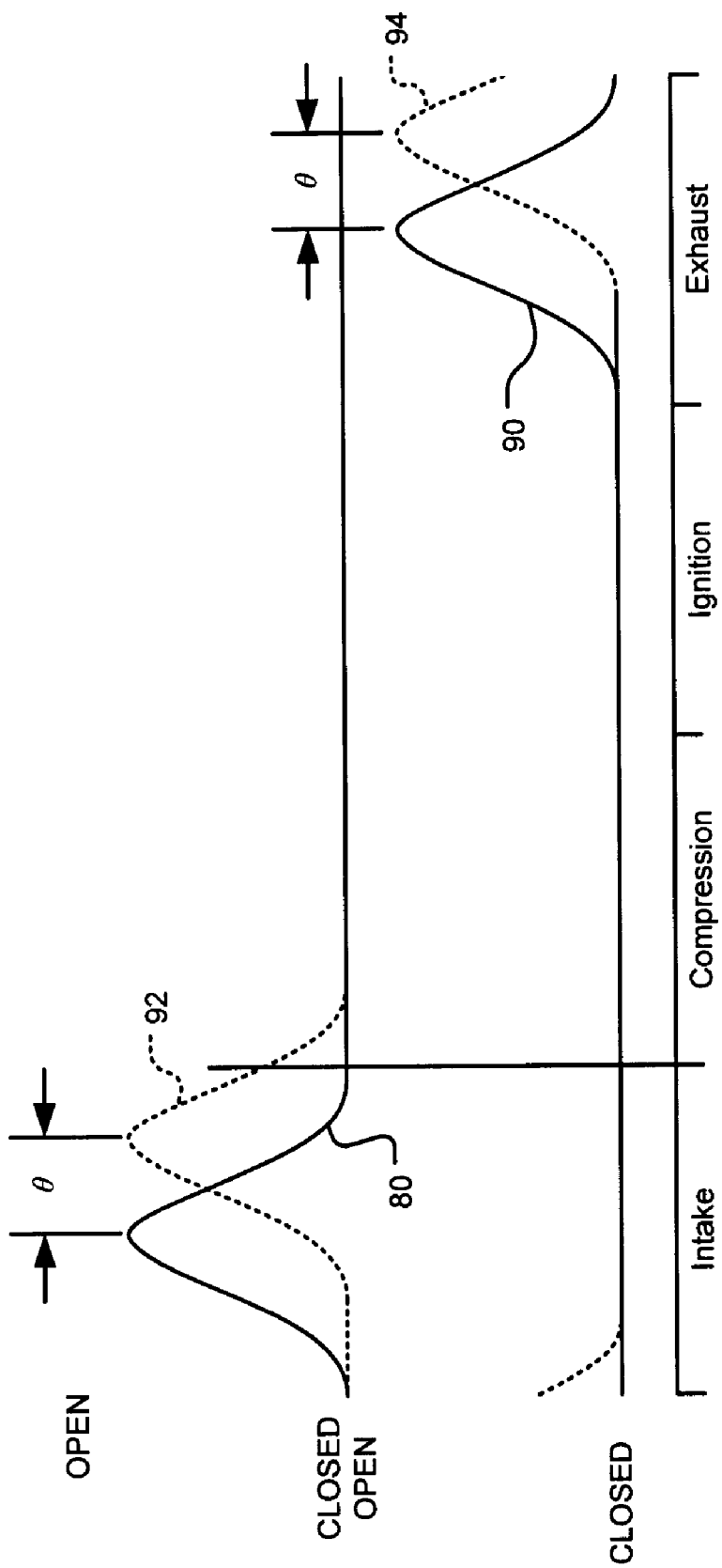
FIG. 2 is an intake valve phasing diagram of the engine of FIG. 1 while being started and while running.

Engine control module 12 includes an output that that communicates with cam phaser 34 to selectively establishes a cam phase angle θ (best seen in FIG. 2). Engine control module 12 also includes outputs that control an electric fuel pump 60, fuel injector 62, and a starter 52. A crank shaft position sensor 64 generates a signal based on a speed of crank shaft 40 and communicates the crank shaft signal to engine control module 12.

When engine 10 is being started the speed of cam shaft 26 is too low for mechanical fuel pump 30 to generate an appreciable rate (per unit time) of fuel pressure increase. Therefore, the fuel pressure that is available at fuel injector 62 is lower than when the engine is running. The lower fuel pressure may not be sufficient to provide a desired amount of fuel to the cylinder 14. This is particularly true when the fuel is an ethanol which has a lower energy density than gasoline and cylinder 14 requires more fuel to start engine 10. To reduce pressure in cylinder 14 while the engine is starting, engine control module 12 adjusts cam phaser 34 so that it introduces cam phase angle θ. The cam phase angle 8 holds open intake valve 18 during at least a portion of a compression stroke of engine 10. The resultant reduced cylinder pressure increases the fuel flow rate through fuel injector 62 and also reduces the load presented on starter motor 52. The reduced load allows starter motor 52 to rotate crank shaft 40 at a higher RPM. The higher RPM reduces the amount of time that is needed for mechanical fuel pump 30 to develop an appreciable fuel pressure.

Referring now to FIG. 2, a timing chart shows the four strokes of an engine cycle. The motions of intake valve 18 and exhaust valve 20 are shown at 80 and 90, respectively. It can be seen that intake valve 18 closes before a beginning of its associated compression stroke while the engine is running. However, when engine 10 is being started, cam phaser 34 introduces cam phase θ. Cam phase θ causes intake valve 18 to remain open during a portion of the compression stroke as shown at 92. When exhaust lobe 24 and intake lobe 22 are on the same cam shaft 26 then opening and closing exhaust valve 20 may also be shifted by cam phase θ as shown at 94.

Figure 3:
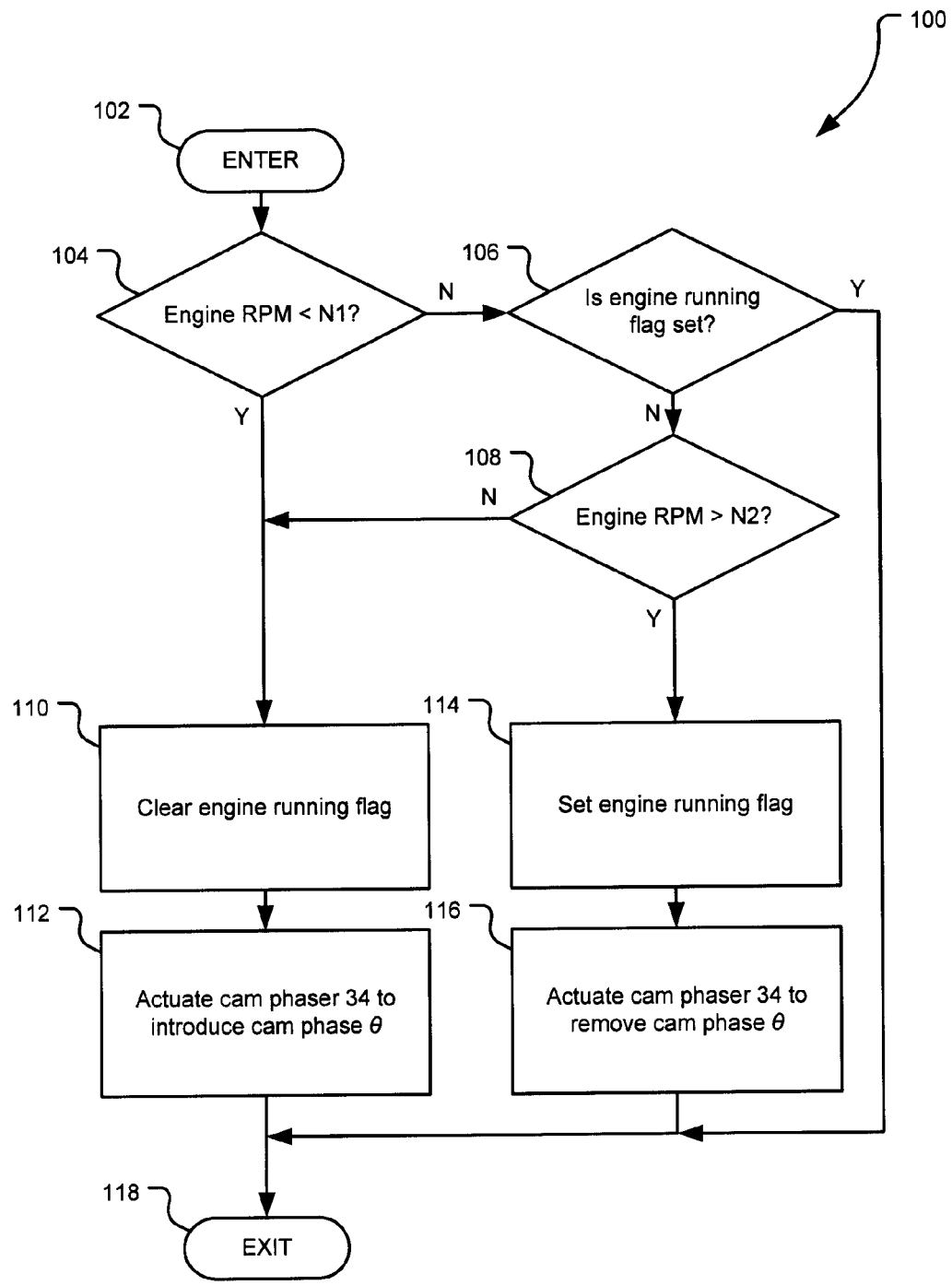
FIG. 3 is a flowchart of a method of changing the intake valve phasing of FIG. 2.

Referring now to FIG. 3, a method 100 shows when to introduce phase angle θ. Method 100 can be executed by engine control module 12. Method 100 can be implemented as computer readable instructions that are stored in a tangible computer readable memory included in engine control module 12.

Control enters via block 102 and immediately proceeds to decision block 104. In decision block 104 control determines whether the speed of engine 10 is less than N1 revolutions per minute (RPM), where N1 is a rational number. N1 should be selected to be greater than a cranking RPM of engine 10. If the engine RPM is less than N1, then control branches to block 110 and clears an "engine running" flag. The engine running flag can be implemented as a single bit in engine control module 12. Control then proceeds to block 112 and adjusts cam phaser 34 to introduce cam phase θ. Control then exits to other tasks via block 118.

Returning now to decision block 104, if the engine RPM is greater than N1 then control branches to decision block 106. In decision block 106 control determines whether the engine running flag is set. If so then control exits to other tasks via block 118. If not, then control branches to decision block 108 and determines whether the engine RPM is greater than N2, where N2 is a rational number. The value of N2 should be greater than N1 to provide an RPM hysteresis between introducing and removing cam phase θ. Also, N2 should also be less than a lowest anticipated idle RPM of engine 10.

If the engine RPM is less than N2 in decision block 108, then engine 10 is not running and control branches to block 110. On the other hand, if the engine RPM is greater than N2 then engine 10 has started. Control then branches to block 114 and sets the engine running flag. Control then proceeds to block 116 and actuates cam phaser 34 to remove cam phase phase θ. Control then exits to other tasks via block 118.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
a cam phaser that introduces a cam phase angle θ between a camshaft intake lobe and an associated crankshaft; and
an engine control module that communicates with the cam phaser to introduce the cam phase angle θ while an engine is being started and wherein the cam phase angle θ is selected such that the camshaft intake lobe opens an intake valve during at least a portion of a compression stroke of a cylinder that is associated with the camshaft intake lobe.

2. The engine control system of claim 1 further comprising a mechanical fuel pump that is driven by the camshaft.

3. The engine control system of claim 1 wherein the engine control module communicates with the cam phaser to eliminate the cam phase angle θ after the engine is started such that the camshaft intake lobe is closed during a compression stroke of a cylinder that is associated with the camshaft intake lobe.

4. The engine control system of claim 1 further comprising fuel injector that injects fuel directly into the cylinder.

5. A method of controlling an engine, comprising:
determining whether an engine is being started; and
introducing a cam phase angle θ while the engine is being started, wherein the cam phase angle θ is selected such that an intake valve is open during at least a portion of a compression stroke of a cylinder that is associated with the intake valve.

6. The method of claim 5 further comprising eliminating the cam phase angle θ after the engine is started such that the intake valve is closed for the duration of the compression stroke.

7. The method of claim 5 further comprising injecting fuel directly into the cylinder.

8. An engine control system, comprising:
- a cam phaser that controls a cam phase angle θ between a camshaft intake lobe and an associated crankshaft of an engine;
- a fuel injector that injects fuel directly into a cylinder;
- a fuel pump that is driven by the engine and that provides the fuel to the fuel injector; and
- an engine control module that communicates with the cam phaser to introduce the cam phase angle θ while the engine is being started and to eliminate the cam phase angle θ after the engine is started, wherein the cam phase angle θ is selected such that the camshaft intake lobe opens an intake valve during at least a portion of a compression stroke of a cylinder that is associated with the camshaft intake lobe.

9. The engine control system of claim 8 wherein the engine control module compares engine RPM to predetermined RPMs N1 and N2 to determine whether the engine is being started, wherein N1 and N2 are rational numbers.

* * * * *